United States Patent
Barrenscheen et al.

(10) Patent No.: US 8,432,215 B2
(45) Date of Patent: Apr. 30, 2013

(54) CHARGE PUMP

(75) Inventors: Jens Barrenscheen, Munich (DE); Martin Feldtkeller, Munich (DE)

(73) Assignee: Infineon Technologies Austria AG, Neubiberg (DE)

( * ) Notice: Subject to any disclaimer, the term of this patent is extended or adjusted under 35 U.S.C. 154(b) by 0 days.

(21) Appl. No.: 13/247,854

(22) Filed: Sep. 28, 2011

(65) Prior Publication Data
US 2012/0075009 A1 Mar. 29, 2012

(30) Foreign Application Priority Data
Sep. 29, 2010 (DE) .......................... 10 2010 046 964

(51) Int. Cl.
*G05F 1/10* (2006.01)
(52) U.S. Cl.
USPC ......................................... 327/536; 327/594
(58) Field of Classification Search .......... 327/170–175, 327/31, 35–36, 536, 594, 316
See application file for complete search history.

(56) References Cited

U.S. PATENT DOCUMENTS
7,120,245 B2 * 10/2006 Knubben et al. ......... 379/399.01
2010/0284452 A1 * 11/2010 Allen ............................ 375/220

FOREIGN PATENT DOCUMENTS
DE 102009029307 A1 3/2011
WO 0190828 A2 11/2001

* cited by examiner

*Primary Examiner* — An Luu
(74) *Attorney, Agent, or Firm* — SpryIP, LLC

(57) ABSTRACT

A charge pump for transmitting energy and data has a primary side, a secondary side and a first coupling capacitance by way of which the primary side is connected to the secondary side, wherein the primary side is designed to periodically transmit energy in the form of a charge packet to the secondary side with the first coupling capacitance during a charge pump interval, the primary side being designed to impress an item of data on the charge pump interval by modulation, wherein the secondary side is designed to receive the item of data by demodulating the charge pump interval, wherein the secondary side is designed to impress an item of data on the charge pump interval by modulation, and wherein the primary side is designed to receive the item of data by demodulation of the charge pump interval.

14 Claims, 6 Drawing Sheets

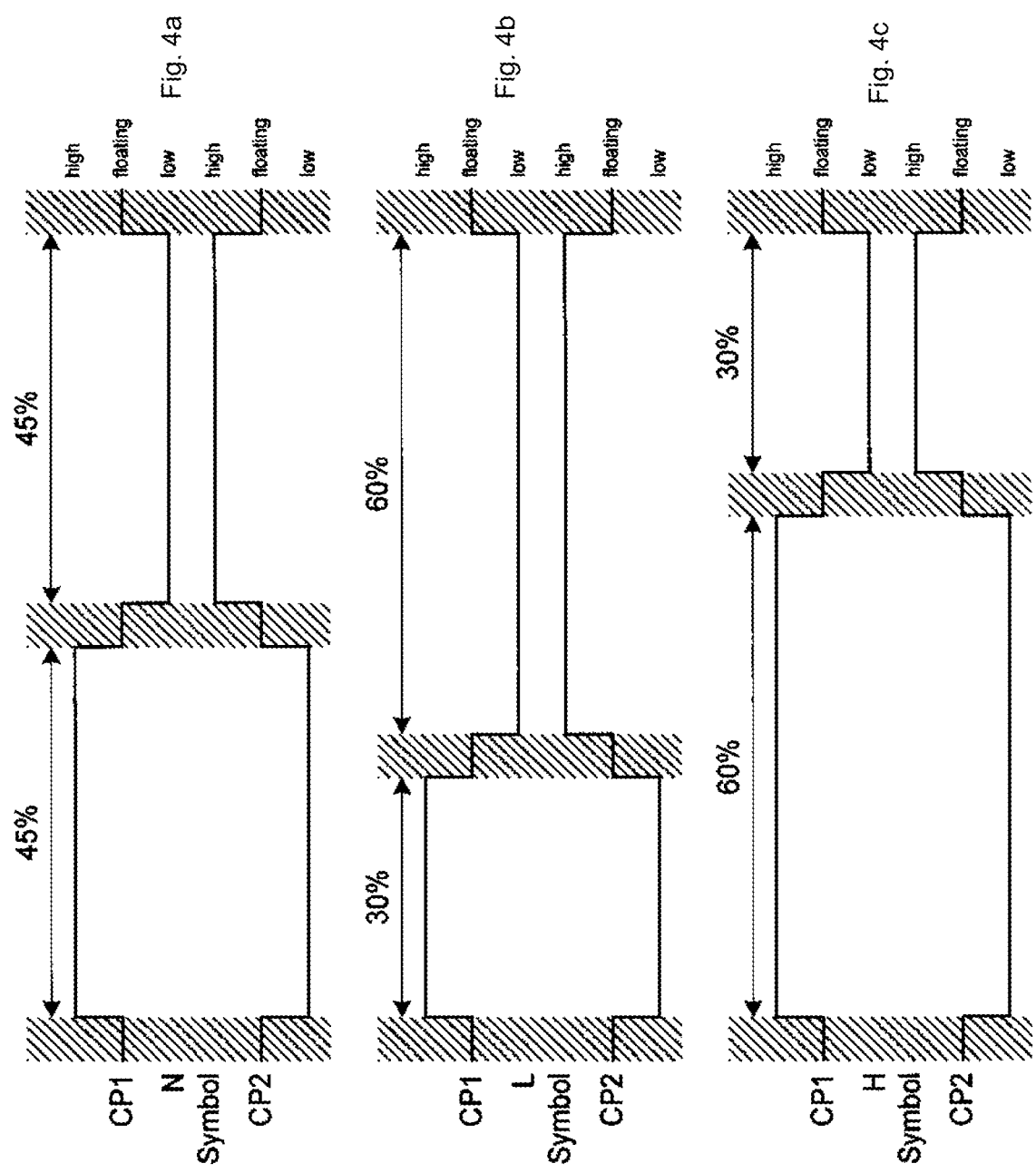

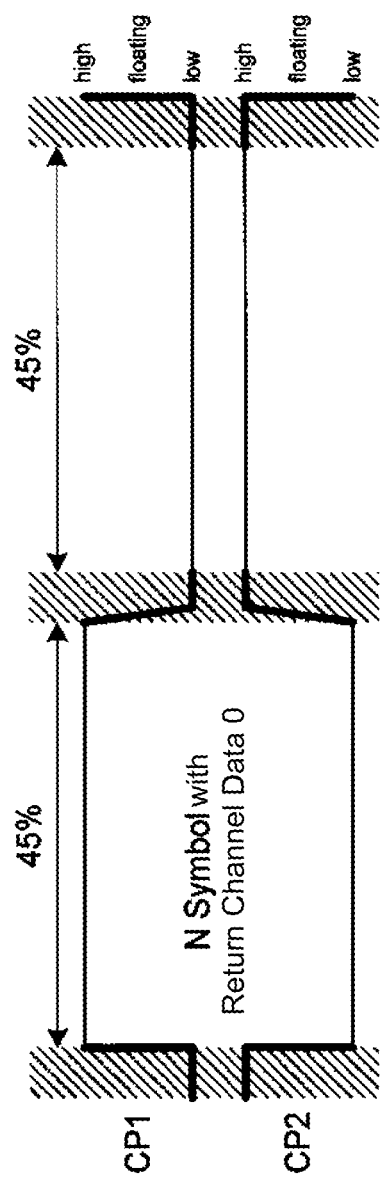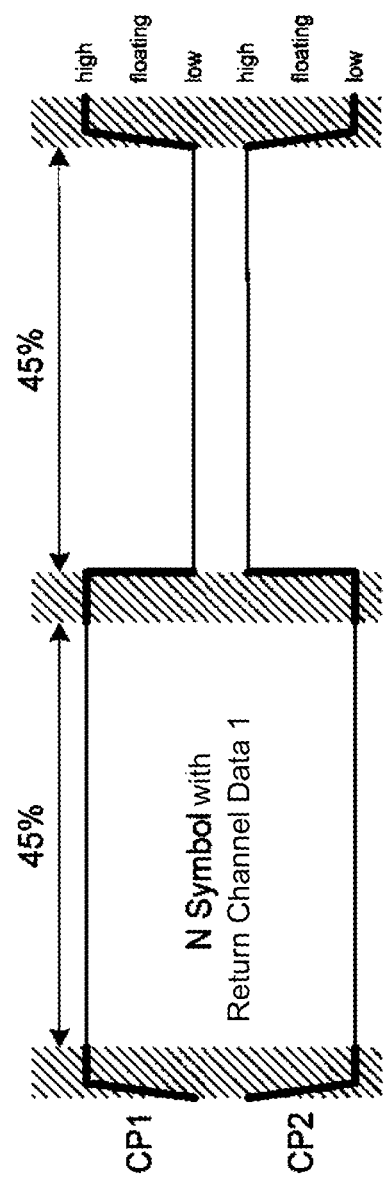

CHARGE PUMP

RELATED APPLICATIONS

This Application claims priority benefit of DE Patent Application No.: 102010046964.5, filed on Sep. 29, 2010. The entire contents of the DE Patent Application No.: 102010046964.5 are hereby incorporated herein by reference.

BACKGROUND

The present invention relates to a charge pump for transmitting energy and data.

Charge pumps have a wide area of application in electronics for providing a supply voltage. Charge pumps are used when, as well as a first supply voltage, a second supply voltage is also required, the supply voltage range of which lies at least partially outside the first supply voltage or is to be at least partially independent of the first supply voltage. These different supply voltages are referred to as voltage domains.

When operating different voltage domains, energy is supplied to the individual domains by different methods, such as charge pumps or DC/DC converters for example, depending on the energy requirement of a domain.

When charge pumps are used, energy is transmitted from a first domain to a second domain with the help of pump capacitors. Here, the energy-emitting voltage domain is referred to as the primary side and the energy-receiving side as the secondary side.

In many applications, there are different voltage domains between which data have to be exchanged. Different methods are available for this purpose, such as optical transmitters, pulse transmitters or, in the simplest case, level shifters for example. An important aspect in data transmission is the energy required to achieve this. In general, it can be stated that the energy required increases with increasing speed and increasing demands on data integrity.

With charge pumps, methods have been disclosed in which information and data as well as energy can be transmitted from the primary side to the secondary side. They work with the help of a modulation of parameters of the primary side charge pump stage.

With the known methods, a bidirectional data stream cannot be transmitted via the charge pump, as the return path for data from the secondary side to the primary side is missing. With the known methods, a separate data transmission path is required for this reverse transmission.

In addition, the efficiency of the charge pump is reduced due to the modulation, as it is not always possible to work with parameters which are optimum for energy transmission. It is therefore necessary to reach a compromise between energy transmission and data transmission.

It is possible to differentiate between two principles of data transmission depending on the type of data usage: the transmission of an item of data, e.g. a control bit for a function, wherein the item of data is to arrive at a certain point, or is characterized by a certain parameter and does not occur mixed with other data in time or function. This principle of single bit transmission is used where the number of items of data to be transmitted is low or only a very few bits are to be transmitted.

When transmitting a data stream, wherein a plurality of information units are transmitted consecutively in time, it is important to have a time reference in order to be able to assign a relevance in the data stream to each individual information unit, such as a bit or a symbol. This type of transmission is used where quantities of data which cannot be covered by a single bit transmission are transmitted.

Examples of this are serial transmission with the help of a synchronous SPI, an asynchronous RS232 or an LIN interface.

In the case of synchronous transmission, e.g. with an SPI, the length of each bit is determined by a clock pulse transmitted on a second line, enabling the individual bits to be clearly differentiated from one another. In addition, the start and end of a data word, the time-related sequencing of information units, can be signaled by a third line. The relevance accorded to a transmitted information unit is therefore always unambiguous, as its position in the data word can be clearly assigned. As both the length of an information unit and also the start and end of the data word are signaled, it is substantially unnecessary for there to be a relationship between the clock systems of the two domains between which the data are transmitted. That is to say, there is no need for a clock system for demodulating the data on the secondary side.

In contrast with this is the asynchronous RS232 protocol or LIN interface, with which only one information unit is transmitted at a time. The individual units are separated from one another in time so that a clock pulse, which must have a certain stability, must be provided both in the transmitter and in the receiver. For example, a maximum relative deviation between the clock pulses of only 3% is allowed during a data word.

The start and end of the data word are defined by additional information units which are transmitted before and after the data word respectively, e.g. start-of-frame (SOF), stop bits. The advantage of this transmission compared with synchronous transmission lies in the low number of transmission channels required, one, in contrast to two to three transmission channels with synchronous transmission. However, this advantage assumes a stable clock system in the transmitter and the receiver.

One possibility of synchronization between the transmitter and receiver consists in counting the number of periods of the charge pump and thereby determining the length of data symbols. However, this has the disadvantage that a counter with evaluation logic has to be implemented on both sides, wherein the counter with the evaluation logic must be fast enough to count all periods without errors and record the information content correspondingly quickly. In doing so, incorrect or missing count pulses due to interference, e.g. due to transient interference in the transmitter or in the receiver, give rise to shifted counter states when evaluating the charge pump periods which can lead to incorrect interpretation of the data. To prevent this, it is necessary to synchronize the counters or to set them to a predefined value, e.g. 0, sufficiently often.

SUMMARY OF THE INVENTION

One implementation provides a charge pump with which bidirectional data transmission is possible as well as the transmission of energy from a primary side to a secondary side.

The charge pump for transmitting energy and data comprises a primary side, a secondary side and a first coupling capacitance by way of which the primary side is connected to the secondary side. The primary side is designed to periodically transmit energy in the form of a charge packet to the secondary side with the first coupling capacitance during a charge pump interval, the primary side being designed to impress an item of data on the charge pump interval by modulating the parameters of the charge pump interval. Examples of these modulated parameters of the charge pump driver are the mark-space ratio, the frequency, the amplitude and the position of the phases with respect to one another. These modulated parameters are demodulated on the secondary side to obtain the data content. The secondary side is designed to receive the item of data by demodulating the charge pump interval. The secondary side is designed to impress an item of data on the charge pump interval by modulation, wherein the primary side is designed to receive the item of data by demodulation of the charge pump interval.

A charge pump interval comprises a period in which a charge and discharge operation of at least one coupling capacitance is completed. Examples of the parameters of a charge pump interval which are determined by the primary side are the mark-space ratio, the frequency, the amplitude and the phase position of at least two coupling capacitances. An example of a parameter determined by the secondary side is the amplitude or the potential of a coupling capacitance during a dead time interval.

The charge pump provides for operating a capacitive charge pump, wherein both energy and a bidirectional data stream can be transmitted simultaneously between two voltage domains. As well as a data forward channel from the primary side to the secondary side, the data transmission can be optimized to provide a data return channel from the secondary side to the primary side without appreciable energy expenditure. The data transmission can be optimized to provide the data return channel from the secondary side to the primary side without appreciable additional outlay on circuitry, so that the additional surface area in an integrated circuit remains small.

An item of data is transmitted via the data return channel during a dead time interval of a primary-side power driver, wherein the dead time interval is the time interval of the charge pump interval during which the primary-side power driver of the charge pump has a high impedance and the primary-side and secondary-side connection to the coupling capacitance has a high impedance (or is floating). High impedance describes the state in which nodes of a circuit have a high resistance. For example, the output node of the power driver has a high impedance when this power driver is switched off. By comparison, the low impedance states of the power driver at its output node are "high" or "low" or the low-impedance connection to a supply voltage or ground. The term high impedance also describes a state when the resistance of the node is so large that the effect on other parts of the circuit or circuit nodes can be ignored. This state is used to determine the potential of the coupling capacitor on the secondary side via the connection to the coupling capacitor. Compared to the power driver on the primary side, only a weak driver is required on the secondary side for this purpose.

The potential determined by the secondary side can be evaluated on the primary side in that a signal measuring circuit on the primary side is synchronized with the dead time interval, measures the potential, and a signal evaluation circuit acquires the transmitted item of data by evaluation.

In transmitting data by primary-side modulation of the charge pump, the present invention starts from at least two separately representable symbols from which the length and content of each information unit, an item of data, can be determined. If more symbols can be represented, more information can be transmitted per time unit. For example, a third symbol can represent a neutral state of the item of data.

The present invention is explained below with reference to a two-phase charge pump with a modulation on three symbols. The modulation of the mark-space ratio is understood to be only an example, as other characteristics of the transmission form of the charge pump, such as frequency, amplitude and the phase position of two or more coupling capacitances, can also be modulated. With multi-phase charge pumps, the phase position can be modulated in order to transmit data.

The symbols can also be generated by modulating more characteristics of the transmission form of the charge pump in order, for example, to increase the data integrity or its distinguishability.

From the point of view of data flow, the charge pump according to one implementation includes two paths, the structure of which is shown in FIG. 1.

On the one hand, the primary side has a transmitter which controls the modulation of the characteristics of the transmission form of the charge pump of one forward channel. This transmitter is connected to the secondary side by way of at least one coupling capacitance, wherein the transmitter periodically provides the at least one coupling capacitance with energy-transmitting charge packets. The secondary side has a rectifier for receiving the energy-transmitting charge packet and a receiver for conditioning the signal and for demodulating the data of the return channel.

On the other hand, the secondary side has a transmitter which controls the modulation of the characteristics of the transmission form of the charge pump of a return channel. The primary side has a receiver for conditioning the signal and for demodulating the data of the return channel.

The modulation of the return channel can be synchronized with the switching times of the charge pump, as this enables the times at which that of the return channel can best be measured to be easily determined.

The charge pump according to the invention therefore has several advantages compared with known charge pumps.

The charge pump according to the invention enables a bidirectional stream of data with the same data rates for forward and return channel even while energy is being transmitted.

The charge pump according to the invention has no loss of bandwidth of the forward channel, as the return channel has an independent modulation principle.

The charge pump according to the invention can use a plurality of symbols for data transmission, wherein at least one symbol is optimized for the transmission of the return channel.

The charge pump according to the invention can optimize individual time intervals or symbols either for data transmission or for energy transmission.

The charge pump according to the invention can determine an item of data by the time sequence of a charge pump interval of the charge pump or by the length or sequential arrangement of the symbols.

The charge pump according to the invention can set up a data stream by the sequential arrangement of the symbols, wherein the start and end of data words are clearly defined.

A dedicated clock system on the secondary side is not required for the charge pump according to the invention.

BRIEF DESCRIPTION OF THE DRAWINGS

Embodiments are explained in more detail below with reference to the following drawings, in which:

FIG. 4 shows the coding of three symbols by modulation of the mark-space ratio.

FIG. 5 shows the coding of the data return channel.

DETAILED DESCRIPTION

Figure 1:
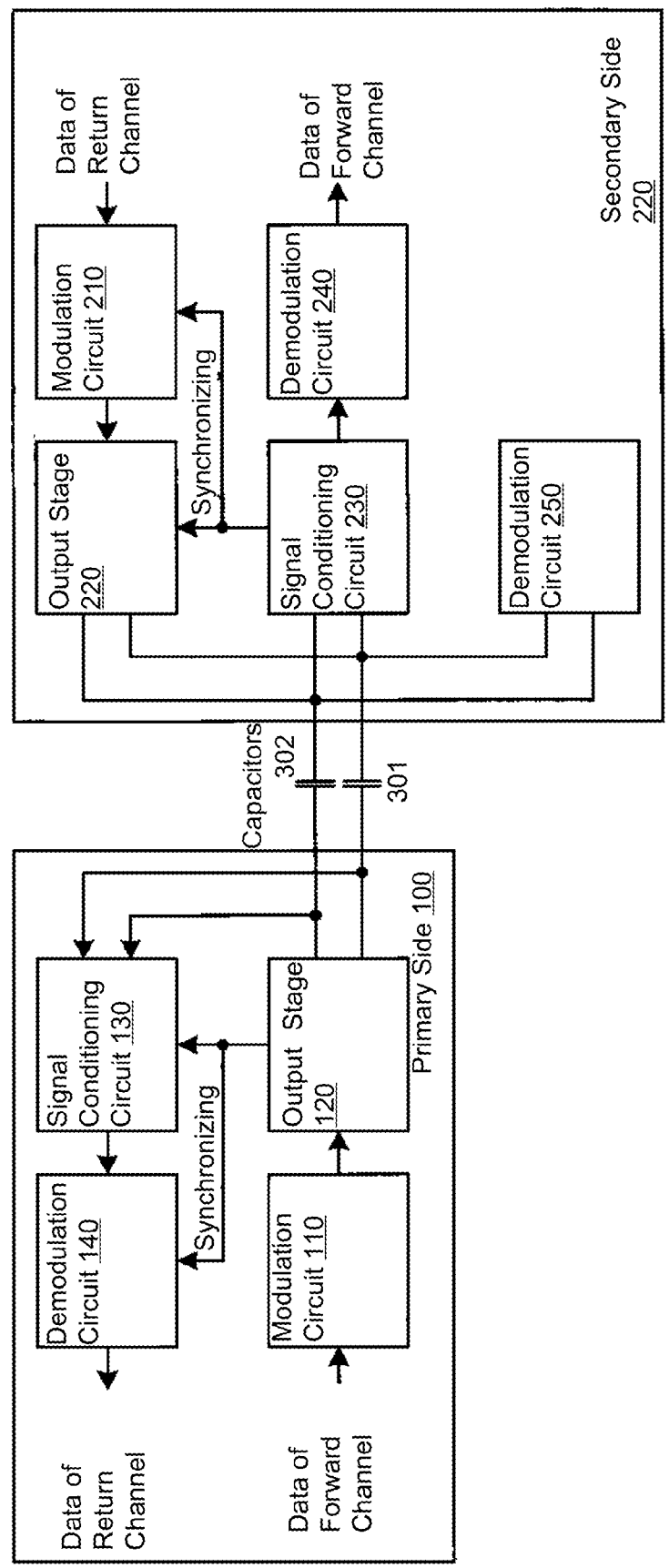
FIG. 1 shows a charge pump according to the invention.

FIG. 1 shows an exemplary embodiment of a charge pump having a primary side 100, a secondary side 200 and two coupling capacitors 301, 302. The primary side 100 has a modulation circuit 110, an output stage 120, a signal conditioning circuit 130 and a demodulation circuit 140. The output stage 120 is connected to the coupling capacitors 301, 302. The output stage periodically charges the coupling capacitors 301, 302 with charge carriers. An input of the output stage 120 is connected to an output of the modulation circuit 110. The output stage 120 can be controlled by the modulation circuit 110 in such a way that the characteristics of a charge pump interval can be changed for transmitting a charge packet. The modulation circuit 110 has an input which is designed to receive transmitted data. The output stage 120 has a synchronizing output. This synchronizing output can be designed to transmit a synchronizing signal to other parts of the charge pump circuit. By way of example, a synchronizing signal can signal the start, the end or another defined time of the charge pump interval. The signal conditioning circuit 130 is connected by way of an input to the coupling capacitors 301, 302. The signal conditioning circuit 130 measures the characteristics of the voltage on the primary side of the coupling capacitors 301, 302 and can provide this voltage amplified and filtered at an output. The signal conditioning circuit can be connected to the synchronizing output of the output stage 130 in order to receive the synchronizing signal. The output of the signal conditioning circuit 130 is connected to the demodulation circuit 140. The demodulation circuit 140 can be connected to the synchronizing output of the output stage 130 in order to receive the synchronizing signal. The demodulation circuit 140 is designed to extract the data of the return channel from the signal of the signal conditioning circuit 130.

The secondary side 200 of the charge pump has a modulation circuit 210, an output stage 220, a signal conditioning circuit 230, a demodulation circuit 240 and a rectifier 250. The rectifier 250 is connected to the coupling capacitors 301, 302. The rectifier 250 discharges the coupling capacitors 301, 302 so that a voltage can be provided on the secondary side. The signal conditioning circuit 230 is connected by way of an input to the coupling capacitors 301, 302. The signal conditioning circuit 230 measures the characteristics of the voltage on the secondary side of the coupling capacitors 301, 302 and can provide this voltage amplified and filtered at a first output. The signal conditioning circuit 230 generates a synchronizing signal from the received signal and provides this at a synchronizing output. The first output of the signal conditioning circuit 230 is connected to the demodulation circuit 240. The demodulation circuit 240 can be connected to the synchronizing output of the signal conditioning circuit 230 in order to receive the synchronizing signal. The demodulation circuit 240 is designed to extract the data of the forward channel from the signal of the signal conditioning circuit 230.

The output stage 220 is connected to the coupling capacitors 301, 302. An input of the output stage 220 is connected to an output of the modulation circuit 210. The output stage 220 and the modulation circuit 210 can have an input for receiving the synchronizing signal which can be connected to the synchronizing output of the signal conditioning circuit 230. The output stage 220 can be controlled by the modulation circuit 210 in such a way that certain characteristics of a charge pump interval can be changed during the transmission of a charge packet. The modulation circuit 210 has an input which is designed to receive data to be transmitted.

Figure 2:
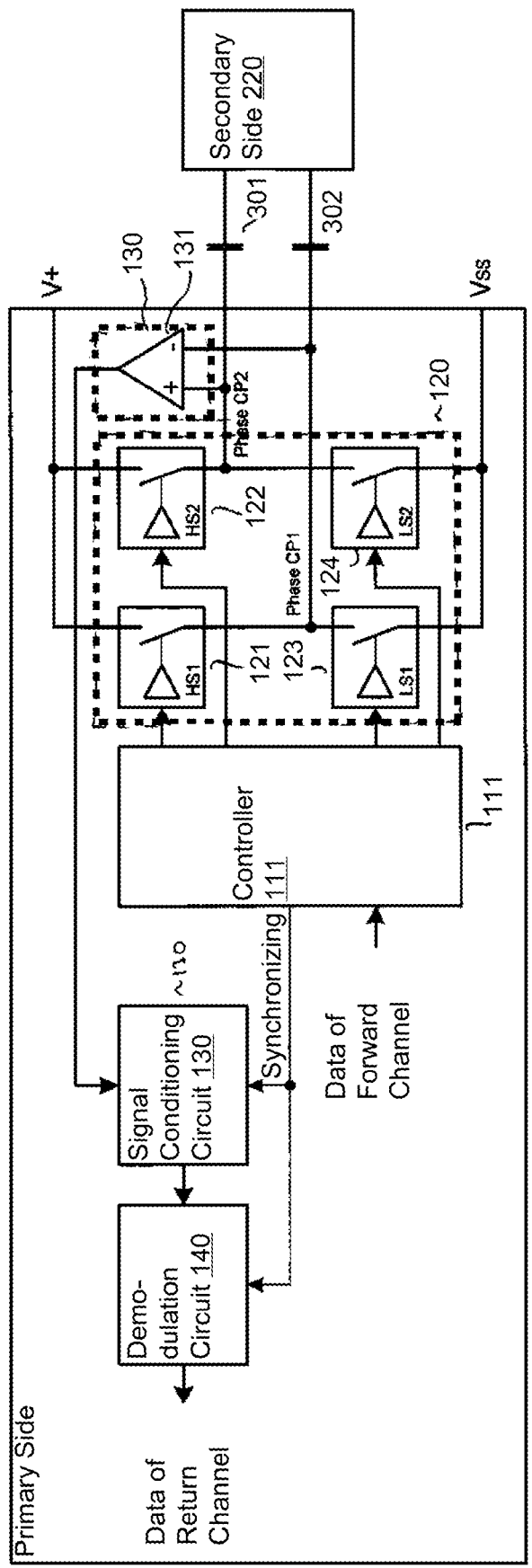
FIG. 2 shows the primary side of a charge pump according to the invention.

FIG. 2 shows an exemplary embodiment of a primary side 100 of the charge pump. The primary side 100 has a charge pump controller 111, an output stage 120 with power drivers 121, 122, 123, 124, a signal conditioning circuit 130 with a differential amplifier 131 for signal conditioning and a demodulation circuit 140. Two power drivers 121, 123 and 122, 124 respectively each drive a connection of a coupling capacitance 302, 301. The power drivers 121, 122, 123, 124 are connected as a half bridge, wherein a half bridge switches a primary-side connection of a coupling capacitor 301, 302 backwards and forwards between a positive and negative voltage. In this exemplary embodiment, the primary-side connections of the coupling capacitors 301, 302 are connected to the inputs of a differential amplifier 131, and an output of the differential amplifier 131 is connected to an input of the signal conditioning circuit 130. The differential amplifier 131 measures the differential voltage characteristic of the primary-side connections of the coupling capacitors 301, 302. If the charge pump has only one coupling capacitor 301, 302, then one input of the differential amplifier 131 can, for example, be connected to a reference voltage. If the charge pump has more than two coupling capacitors 301, 302, then a plurality of differential amplifiers 131 can, for example, each measure two voltage characteristics of two primary-side connections of the coupling capacitors 301, 302 in each case.

Figure 3:
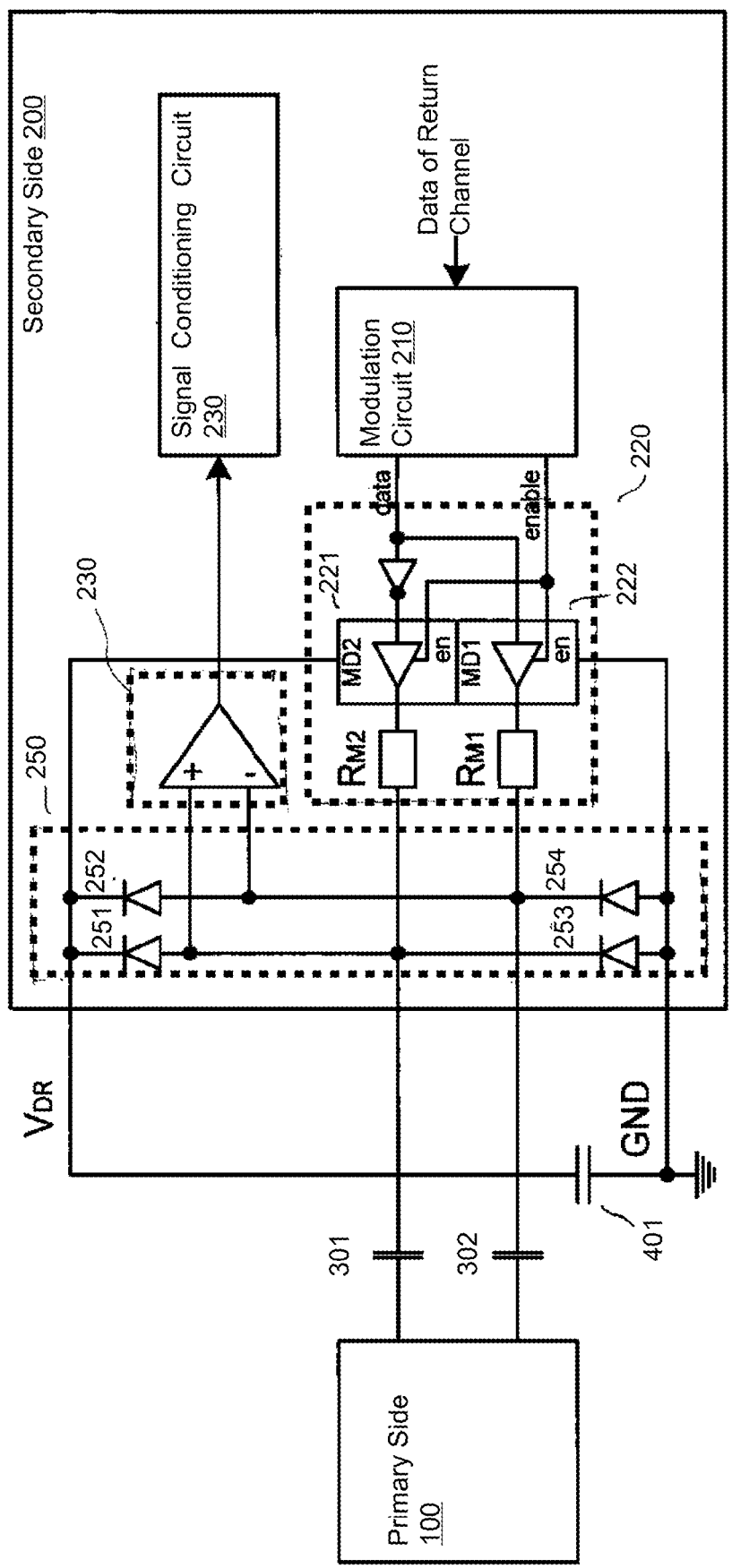
FIG. 3 shows the secondary side of a charge pump according to the invention.

FIG. 3 shows an exemplary embodiment of a secondary side of a charge pump. The secondary side has a modulation circuit 210, an output stage 220 with drivers 221, 222, a signal conditioning circuit 230 with a differential amplifier 231, a rectifier circuit 250 with in each case two diodes 251, 252, 253, 254 per coupling capacitance 301, 302 for rectifying the transmitted charge packets of the coupling capacitors 301, 302 and a buffer capacitor 401 for storing the transmitted charge.

In this exemplary embodiment, the connections of the coupling capacitors 301, 302 are connected to the inputs of a differential amplifier 231, and an output of the differential amplifier 231 is connected to an input of the signal conditioning circuit 230. The differential amplifier 231 measures the differential voltage characteristic of the secondary-side connections of the coupling capacitors 301, 302. If the charge pump has only one coupling capacitor 301, 302, then one input of the differential amplifier 231 can, for example, be connected to a reference voltage. If the charge pump has more than two coupling capacitors 301, 302, then a plurality of differential amplifiers 231 can, for example, each measure two voltage characteristics of two secondary-side connections of the coupling capacitors 301, 302 in each case.

In this exemplary embodiment, the two connections of the coupling capacitors are pre-tensioned either to the positive supply voltage VDR or to the negative supply voltage GND via resistors RM1, RM2. If the resistors RM1, RM2 have a very high impedance, the resulting energy consumption is negligible. If, on the other hand, the resistors RM1, RM2 have too high an impedance, the voltage on the connections of the coupling capacitors 301, 302 takes too long to build up due to parasitic capacitances. The resistors RM1, RM2 should therefore be chosen so that the required state can be achieved in the specified time which is given by the dead time interval.

If the resistors RM1, RM2 are suitably chosen as described, the driver stages MD1, MD2, 221, 222 can remain switched on permanently or for a period while a certain symbol is to be transmitted, so that synchronization with the charge pump period or the charge pump interval is not absolutely necessary. This method greatly simplifies the circuit complexity for the secondary side of the charge pump. The signal conditioning of the forward channel provides unambiguous time information relating to the length of the symbols of the forward channel. For reasons of simplicity, the data stream of the return channel can be synchronized with the data stream of the forward channel. However, it is also possible to implement an alternative time behavior of the return channel.

FIG. 4 shows examples of signal characteristics of a charge pump interval of the charge pump. In this example, for the forward channel, the mark-space ratio of the charge pump interval of a charge pump is modulated with two coupling capacitors. The modulation of the charge pump interval of a charge pump with one or with more than two coupling capacitors is carried out in a similar manner.

A possible coding of 3 symbols for a two-phase charge pump (with the phases CP1, CP2) is shown in FIG. 4. Here, for example, the mark-space ratio of the two phases of the coupling capacitors is modulated while other parameters, such as the phase position for example, remain the same. A dead time interval, during which the output drivers on the primary side are switched off in order to prevent short-circuits of the power drivers, is provided between the two intervals per period, the charge interval and the discharge interval, during which energy is transmitted from the primary side to the secondary side. In the example of FIG. 4, a dead time interval comprises 5% of the total interval, wherein a charge pump interval comprises two dead time intervals so that the total dead time is 10% of the total interval.

In this exemplary embodiment, the individual symbols can be differentiated by measuring the mark-space ratio. A differential amplifier, which averages the difference between the phases CP1 and CP2 over at least one charge pump interval, is used on the secondary side for this purpose. To increase the immunity to interference, a symbol can also extend over a plurality of charge pump intervals. The specified values for the mark-space ratio are to be looked upon as being purely by way of example and qualitative. Values used in practice may differ from these.

FIG. 4a shows the modulation for a neutral symbol N. The intervals in which the charge is transmitted are at least approximately equal.

FIG. 4b shows the modulation for a first symbol L. The first interval in which the charge is transmitted is shorter than the second interval.

FIG. 4c shows the modulation for a second symbol H. The first interval in which the charge is transmitted is longer than the second interval.

In the signal characteristics of FIGS. 4a, 4b, 4c shown, the interval of the charge pump interval during which the primary-side power driver 121, 122, 123, 124 of the charge pump has a high impedance, the dead time interval, has a high impedance, that is to say that no return channel data are transmitted. Not only are the driver stages 121, 122, 123, 124 of the primary side switched off, but the driver stages 221, 222 of the secondary side are also switched off, i.e. have a high impedance.

FIG. 5 shows further examples of signal characteristics of a charge pump interval of the charge pump. In both signal characteristics shown in FIGS. 5a and 5b, as an example the symbol N is transmitted via the return channel. The return channel data are transmitted during the dead time intervals.

FIG. 5a shows the modulation for a first symbol 0. The secondary-side connections of the coupling capacitors 301, 302 do not have a high impedance, but the secondary-side connection of the first coupling capacitor 301 is pre-tensioned to a lower potential by the first driver 221 of the secondary side than the secondary-side connection of the second coupling capacitor 302 by the second secondary-side driver 222.

The driver stages 121, 122, 123, 124 of the primary side have a high impedance, while the driver stages 221, 222 of the secondary side are active and determine the potentials of the coupling capacitances 301, 302 and their connections.

FIG. 5b shows the modulation for a second symbol 1. The connections of the coupling capacitors 301, 302 do not have a high impedance, but the secondary-side connection of the first coupling capacitor 301 is pretensioned to a higher potential by the first driver 221 of the secondary side than the secondary-side connection of the second coupling capacitor 302 by the second secondary-side driver 222.

The modulation of the dead time interval of a charge pump with one or with more than two coupling capacitors is carried out in a similar manner, for example by comparison with a reference voltage in the case of a charge pump with one coupling capacitor.

The effect of the return channel on the primary-side phases of the charge pump is shown in FIG. 5 using the example of the symbol N. Here, a binary coding is assumed with which the two dead time intervals are modulated with unequal values or in anti-phase. It is also possible to transmit information during a dead time interval which is different from that transmitted during the preceding dead time interval.

In FIG. 5, it can be seen that the primary-side voltage differences between the connections of the coupling capacitors during the dead time intervals are clearly different depending on which item of data or which symbol is present at the return channel. To increase the immunity to interference, a symbol can be extended over a plurality of charge pump intervals by transmitting the same symbol during a plurality of consecutive time intervals.

Depending on the choice of modulation parameters of the charge pump and the modulation depth, wherein a reliable differentiation of the symbols should still be guaranteed, the length of the dead time interval can be increased in order to increase the time available for the return channel. For example, if less energy has to be transmitted, it is possible to introduce a symbol which has the same data content as another symbol but enables an improved return channel signaling. The one or the other symbol can therefore be used depending on the application, operating state or energy requirement of the secondary side.

The secondary-side demodulation of the transmission characteristics of the charge pump enables data words to be obtained from the transmitted symbols. Depending on the number of symbols present and boundary conditions of the application, the data can be reconstructed from the symbols in different ways.

Figure 6A:
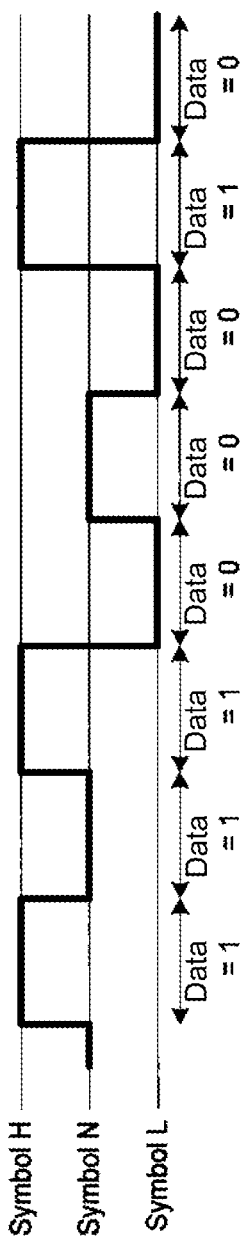
FIG. 6 shows two coding possibilities.
Figure 6B:
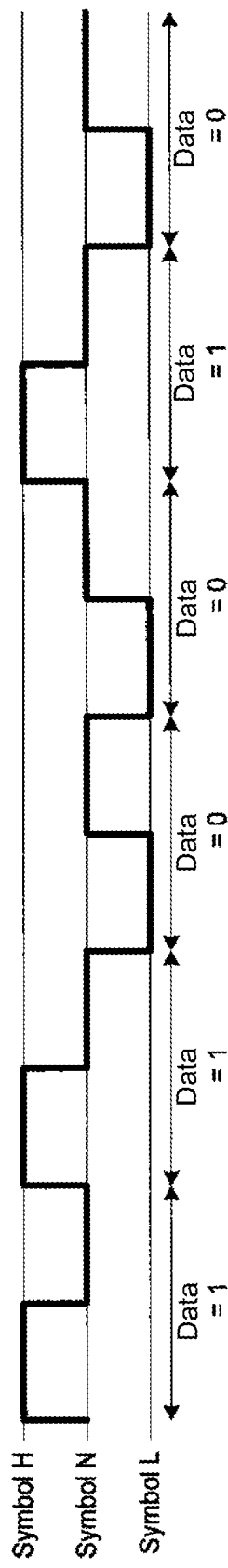

FIGS. 6a and 6b show examples of coding possibilities for the forward channel.

FIG. 6a shows as an exemplary embodiment a type of data coding which is designed for as high a data rate as possible.

For the symbols shown by way of example in FIGS. 4 and 5, the symbol N is distinguished in that energy can be transmitted during an interval which is as large as possible, the period of use of the intervals being distributed symmetrically. The symbols L and H are asymmetrical with regard to the period of use. If the associated slightly reduced efficiency in energy transmission is justifiable in the application, one data bit can be obtained per symbol, the length and value of one data bit or of one item of data being defined by one symbol.

This type of coding can be compared with a non-return-tozero coding shown in FIG. 6a, wherein the most efficient symbol is the zero symbol.

FIG. 6b shows as an exemplary embodiment a type of data coding which is designed for as high energy transmission as possible.

Each item of data, or data bit, contains two symbols, wherein one of the two is always optimized for energy transmission. With this coding, the less efficient symbol is only used for transmitting the value information, while the length of the data bit is defined by the more energy efficient symbol. Sufficient energy can therefore be transmitted to the secondary side before a secondary-side switching operation can be initiated by the next symbol.

This type of coding can be compared with a return-to-zero coding, wherein the most efficient symbol is the zero symbol.

In all cases, the length of the information unit or of the data bit or of the item of data and its value is clearly defined by the symbol. This results in a synchronous transmission mechanism which enables data to be exchanged between the primary side and the secondary side without clock pulse systems which are matched to one another. This is advantageous in that, for example, the secondary side does not require a dedicated clock system, as a shift clock pulse for assembling data words from smaller data units can be derived directly from the charge pump intervals. In this way, the data flow in the return channel can easily be synchronized with the data flow in the forward channel. Accordingly, easily reproducible sampling times for the return channel data are obtained in the primary section.

The shift clock pulse obtained in this way can also be used as a clock pulse for logic on the secondary side. The advantage here is that it is known on the primary side when appropriate responses to the secondary side take place.

The generation of data words from the transmitted information units also includes the reliable detection of the beginning and end of a data word. Here, it is possible to call upon generally known principles such as those known from asynchronous RS232 or LIN coding methods for example. Here, the bit length on the receiver side is known, either thanks to a dedicated, repeatedly retuned oscillator as with LIN, or thanks to the synchronous transmission mechanism described above in the case of the charge pump, as is the length of the data word (format defined on both sides). By adding a start identifier and stop identifier, e.g. a data bit 0 as start-of-frame indicator SOF, individual data words can be easily separated from one another and differentiated.

Depending on the application, signatures, e.g. CRC, parity, etc, can be additionally incorporated for data security.

In this way, the proposed method enables LIN messages or comparable data structures to be transmitted by way of a charge pump, wherein both the write direction and the read direction are supported by the possibility of bidirectional data transmission.

By combining synchronous data transmission with the use of the data structures used in asynchronous data transmission, along with energy, a permanent clock pulse as well as occasional data and continuous data can be transmitted to the secondary side in a simple manner. The charge pump enables data to be transmitted bidirectionally without having to accept a loss in bandwidth or a loss in energy transmission. The use of the dead time of the charge pump interval enables a return channel to be provided without the forward channel incurring penalties with regard to bandwidth or energy transmission.

What is claimed is:

1. A charge pump for transmitting energy and data comprising:
    a primary side,
    a secondary side and
    at least one coupling capacitance by way of which the primary side is connected to the secondary side,
    wherein the primary side is to transmit energy and data to the secondary side by way of at least the at least one coupling capacitance, and wherein the secondary side is to transmit data to the primary side by way of at least the at least one coupling capacitance, and wherein the primary side is to provide an item of data during a charge pump interval, the item of data including modulated parameters of the charge pump interval, and wherein the secondary side is to receive the item of data.

2. The charge pump as claimed in claim 1, wherein the secondary side is to demodulate the modulated parameters associated with the item of data.

3. The charge pump as claimed in claim 2, wherein the secondary side is to provide another item of data during the charge pump interval, the another item of data including modulated parameters of the charge pump interval, and wherein the primary side is to receive the another item of data and demodulate the another item of data to ascertain the parameters of the charge pump interval.

4. The charge pump as claimed in claim 2, wherein the charge pump interval has a charge interval, a discharge interval and at least one dead time interval.

5. The charge pump as claimed in claim 4, wherein the charge interval and the discharge interval are followed by a dead time interval.

6. The charge pump as claimed in claim 4, wherein a first state of the item of data is defined by the charge interval being longer than the discharge interval.

7. The charge pump as claimed in claim 4, wherein a second state of the item of data is defined by the charge interval being shorter than the discharge interval.

8. The charge pump as claimed in claim 4, wherein a third state of the item of data is defined by the charge interval being approximately the same duration as the discharge interval.

9. The charge pump as claimed in claim 4, wherein the primary side is to switch the at least one coupling capacitance to a high impedance during the dead time interval, and wherein the secondary side is to impress an item of data on the secondary side during the dead time interval by modulating the potential of the at least one coupling capacitance, and wherein the primary side is to receive the data of the secondary side during the dead time interval by measuring the potential on the primary side of the at least one coupling capacitance.

10. The charge pump as claimed in claim 4, wherein the charge pump has at least two coupling capacitances, and wherein the discharge interval of a second of the at least two coupling capacitances occurs during the charge interval of a first of the at least two coupling capacitances, and wherein the dead time interval of the second of the at least two coupling capacitances occurs during the dead time interval of the first of the at least two coupling capacitances.

11. The charge pump as claimed in claim 10, wherein the charge interval of the second of the at least two coupling capacitances occurs during the discharge interval of the first of the at least two coupling capacitances.

12. The charge pump as claimed claim 4, wherein the charge pump has at least two coupling capacitances, and wherein the charge interval of a first of the at least two coupling capacitances and the charge interval of a second of the at least two coupling capacitances have a defined time offset with respect to one another.

13. The charge pump as claimed in claim 12, wherein a first state of the item of data is defined by the charge intervals of the first and the second of the at least two coupling capacitances having a greater time offset than the immediately following charge intervals of the charge intervals of the first and the second of the at least two coupling capacitances.

14. The charge pump as claimed claim 12, wherein a second state of the item of data is defined by the charge intervals of the first and the second of the at least two coupling capacitances having a smaller time offset than the immediately following charge intervals of the charge intervals of the first and the second of the at least two coupling capacitances.

* * * * *